(12) United States Patent
Salonen et al.

(10) Patent No.: US 6,609,326 B2
(45) Date of Patent: Aug. 26, 2003

(54) FISHING LURE WITH MOVABLE WEIGHT SYSTEM

(75) Inventors: Raimo Salonen, Kalkkinen (FI); Harri Leppala, Vääksy (FI); Juha Siirtola, Vierumäki (FI)

(73) Assignee: Normark Corporation, Minnetonka, MN (US)

( * ) Notice: Subject to any disclaimer, the term of this patent is extended or adjusted under 35 U.S.C. 154(b) by 0 days.

(21) Appl. No.: 10/056,632

(22) Filed: Nov. 19, 2001

(65) Prior Publication Data

US 2003/0093939 A1 May 22, 2003

(51) Int. Cl.[7] ............................................... A01K 85/00
(52) U.S. Cl. ..................................................... 43/42.22
(58) Field of Search ............................. 43/42.22, 42.31, 43/42.39

(56) References Cited

U.S. PATENT DOCUMENTS

| | | |
|---|---|---|
| 1,394,313 A | 10/1921 | Leeper |
| 2,270,487 A | 1/1942 | Witney |
| 2,488,678 A | 11/1949 | Nardi |
| 2,703,946 A | 3/1955 | Davis |
| 2,716,831 A | 9/1955 | Glass |
| 2,718,725 A | 9/1955 | Thurman |
| 2,878,611 A | 3/1959 | Netherton et al. |
| 2,965,996 A | 12/1960 | Hughes |
| 3,044,207 A | 7/1962 | Dorsett |
| 3,894,350 A | 7/1975 | Parker |
| 4,079,539 A | 3/1978 | Holstein |
| 4,155,191 A | 5/1979 | Spivey |
| 4,223,469 A | 9/1980 | Luz |
| 4,380,132 A | 4/1983 | Atkinson |
| 4,483,091 A | 11/1984 | Norlin |
| 4,630,389 A | 12/1986 | Higgins |
| 4,712,326 A | 12/1987 | Hoover et al. |
| 4,747,228 A | 5/1988 | Giovengo, Jr. |
| 4,761,910 A | 8/1988 | Ninomiya |
| 4,791,750 A | 12/1988 | Gammill |
| 5,134,799 A | 8/1992 | Trunka |
| 5,276,992 A | 1/1994 | Kato |
| 5,329,721 A | 7/1994 | Smith |
| 5,561,938 A | 10/1996 | Kato et al. |
| 5,566,498 A | 10/1996 | Itoh |
| 5,822,912 A | 10/1998 | Kato et al. |
| 5,829,183 A | * 11/1998 | Guerin ................. 43/42.35 |
| 5,924,236 A | 7/1999 | Preston |
| 5,926,995 A | * 7/1999 | Dubois ................. 43/42.31 |
| 5,992,084 A | 11/1999 | Kitagawa |

* cited by examiner

Primary Examiner—Charles T. Jordan
Assistant Examiner—Jordan M Lofdahl
(74) Attorney, Agent, or Firm—Dority & Manning, P.A.

(57) ABSTRACT

A fishing lure with a movable weight system is provided to allow the angler to change the center of gravity of the lure depending upon whether the angler is casting or retrieving.

20 Claims, 4 Drawing Sheets

FISHING LURE WITH MOVABLE WEIGHT SYSTEM

FIELD OF THE INVENTION

The present invention relates to fishing lures. More specifically, the present invention relates to a fishing lure having a movable weight system for changing the position of the lure's center of gravity while fishing.

BACKGROUND OF THE INVENTION

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Fishing lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below.

Generally speaking, artificial lures are frequently deployed by casting the lure, while attached to fishing line, to a desired location within the water and then retrieving the lure using a reel. Anglers may use a variety of casting and retrieval techniques depending on a combination of personal preferences, the type of fish being sought, and the nature of the water being fished. The ability to precisely position the lure at or near particular structure, vegetation, or such other target is generally preferred and may be essential to hooking and landing a catch.

Aside from the skills of each individual angler, several factors about a lure car affect the angler's ability to precisely locate and retrieve a lure during casting. For example, the lure's overall shape, the weight of the lure, and the location of the point of attachment to the fishing line can affect the flight path of the lure during casting and the swim path of the lure during retrieval. Another factor is the lure's center of gravity. More specifically, the location of the center of gravity may affect the precision with which the lure can be cast as well as the movement of the lure as it is worked and retrieved by the angler. For certain lures, the most effective location for the center of gravity of a lure while casting may not be identical to the best location when the lure is being retrieved. A lure capable of shifting its center of gravity to maximize the overall effectiveness of the lure depending upon whether the lure is being cast or retrieved would be preferred.

BRIEF SUMMARY OF THE INVENTION

Objects and advantages of the invention will be set forth in part in the following description, or may be obvious from the description, or may be learned through practice of the invention.

The present invention provides a fishing lure having a movable weight system for changing the position of the lure's center of gravity during fishing. By having a movable weight system, the lure's center of gravity may be positioned at two different locations within the lure depending upon whether the lure is being cast or retrieved. During casting, the weights are moved towards the rear of the lure so as to similarly change the lure's center of gravity. With the fishing line generally attached towards the front portion of the lure, a rearward center of gravity generally results in a lure that can be cast farther and with more accuracy than a lure having the same shape but lacking the movable weight system. While the exact reasons for this result are unknown, it is believed that a lure without such a weight system tends to tumble or rotate during casting so as to unfavorably affect the flight path and retard velocity. Tumbling or rotation of a lure during casting also may have the undesirable effect of entangling the hooks on the lure in the fishing line attached to the lure.

In one exemplary embodiment of the present invention, a fishing lure is constructed from a body having an interior channel that is oriented longitudinally with the body. The body may have any desired shape including, for example, any of a variety of baitfish or other food sources. The body may also be decorated with various ornamental features and colors as desired. In addition, diving planes, fins, or other items may be added to the lure to affect the characteristics of the lure's swim path during retrieval and to enhance the visual effectiveness of the lure. In certain alternative embodiments, the body may be constructed as an insert that is placed inside a shell—with the shell providing the overall shape of the lure to which features or decoration may be added.

Continuing with the exemplary embodiment being described, a loop configured for the receipt of a hook may be connected to the body of the lure. By way of example only, the loop may be constructed from wire or may be formed as part of the body. The loop may be located where desired on the body. Alternatively, the body may be provided with multiple loops positioned as desired along the body. A hook may be attached to any one of the loops. The hook may be of a size and shape as desired for the particular size lure body being used. Optionally, the hook may be a treble hook. Mechanisms other than a loop may also be used for attaching a hook or hooks to the lure body. In general, a loop or other mechanism may be also provided for attaching the fishing line to the lure body. Such mechanism is typically positioned towards the front of the lure body but this is not required.

This exemplary embodiment includes a plurality (two or more) of weights that are configured for movement along the interior channel of the lure body. While such weights may be constructed from any number of materials, typically a dense metal such as lead or steel is employed. The weights may be cylindrically-shaped or generally circular to facilitate movement along the interior channel. Grooves or changes in the outer radius of the weights may also be employed to help guide the movement of the weights within the interior channel. While the present embodiment under discussion includes a plurality of such weights, it should be understood that a lure body having a single movable weight is within the scope of the present invention.

Also included with this particular exemplary embodiment is a lock mechanism that is configured to move along the interior channel in conjunction with the plurality of weights. The lock mechanism includes a retractable boss that is positioned within the lock mechanism. When the lure is being retrieved through the water, the retractable boss is located in an extended position so as to secure the position of the lock mechanism at the front of the lure during the retrieve and thereby also maintain the plurality of weights towards the front of the lure. For casting, the retractable boss has a retracted position for allowing the lock mechanism to move to the rear of the lure and thereby position the weights at the rear of the lure during the cast.

To assist the lock mechanism with securing the position of the plurality of weights, other features may by added to the interior channel. By way of example, the interior channel may include an incline in the longitudinal direction moving from the head section to the tail section of the body. A recess may also be included in the interior channel for receipt of the retractable boss. Upon landing in the water after the cast, the weights are located toward the rear or tail section of the lure body. As the lure is retrieved the weights travel down the incline and are secured into position by insertion of the retractable boss into the recess. Features may also be added to the lock mechanism to facilitate its operation. By way of example only, the lock mechanism may be equipped with a pocket for receipt of at least one of the plurality of weights. Such a feature would allow the lock mechanism to travel with the plurality of weights along the interior channel during casting and retrieval. The lock mechanism and retractable boss are just one example of features for positioning the weights during casting and retrieval; other examples are within the scope of the present invention as set forth in the claims that follow.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

DETAILED DESCRIPTION

Figure 1:
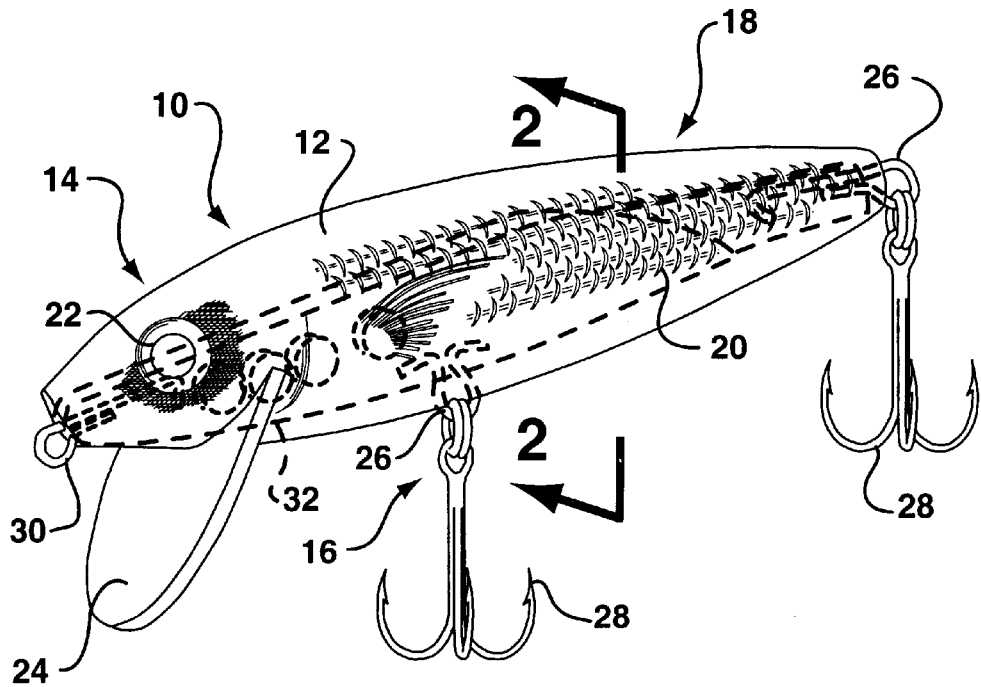
FIG. 1 is a perspective view of an embodiment of a lure according to the present invention.

Reference now will be made in detail to the embodiments of the invention, one or more examples of which are set forth in the drawings. Each example is provided by way of explanation of the invention, and not meant as a limitation of the invention. For example, features illustrated or described as part of one embodiment may be used with another embodiment to yield still a further embodiment. In fact, it will be apparent to those skilled in the art that various modifications and variations can be made in the present invention without departing from the scope or spirit of the invention.

Referring to FIG. 1, an exemplary embodiment of a fishing lure body 10 according to the present invention is illustrated. The lure body 10 includes a hull 12 configured in the overall shape of the lure. It should be appreciated that the size and shape of the hull 12 may be configured in various combinations depending on the particular type of lure body 10 desired. In the illustrated embodiment, hull 12 has a generally streamlined configuration and includes a head section 14, a middle section 16, and a tail section 18. While any suitable material may be used for construction of hull 12, wood or plastic are preferred because these materials can be readily shaped and decorated as desired.

The hull 12 includes any number or combination of ornamental features intended to provide the lure body 10 with a more realistic and life-like appearance. For example, the hull 12 may be provided with scales, gills, fins, eyes, or other characteristics. Examplary hull 12 includes ornamental features such as scales 20 and eye 22. A diving plane 24 is located near the head section 14 of hull 12. As the lure is being retrieved through the water, diving plane 24 drives the lure body 10 to a certain depth within the water. The depth to which the lure body 10 will travel is dependent upon variables such as the angle of plane 24 and the speed of the retrieve.

For this exemplary embodiment of the invention, lure body 10 is equipped with two hook loops 26 for attachment of treble hooks 28. FIG. 1 is only an example of the number and positioning of loops 26 and hooks 28. One or any number of various types of hooks may be positioned on lure body 10 as desired. Also shown by way of example is line loop 30 for the attachment of fishing line to the lure body 10. Other mechanisms may be used in a variety of configurations and locations on lure 12 for attaching the line.

Figure 2A:
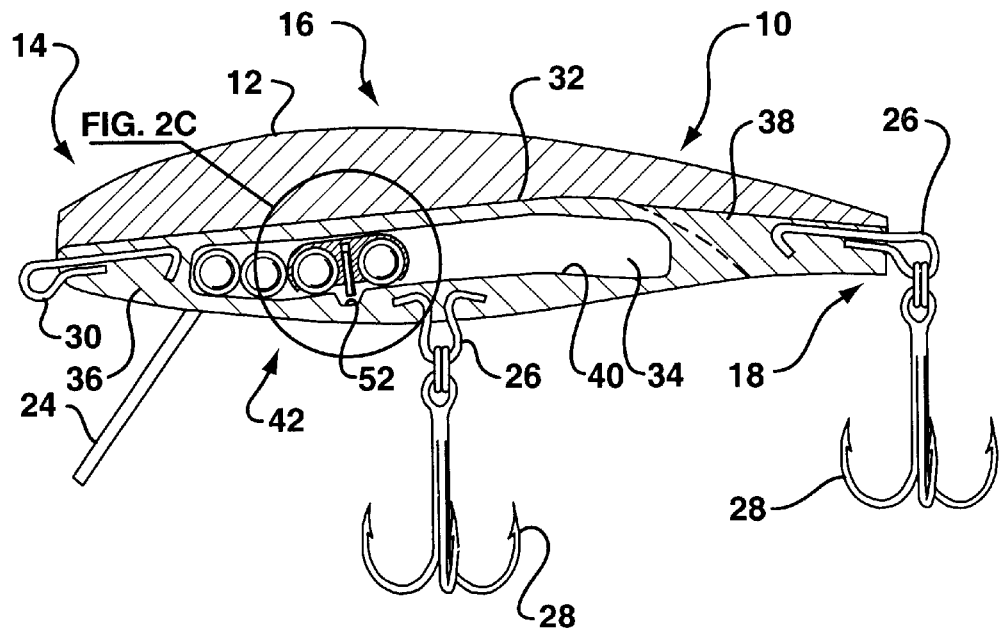
FIG. 2A is a cross-sectional view of the embodiment of a lure illustrated in FIG. 1 and taken along line 2—2.
Figure 2B:
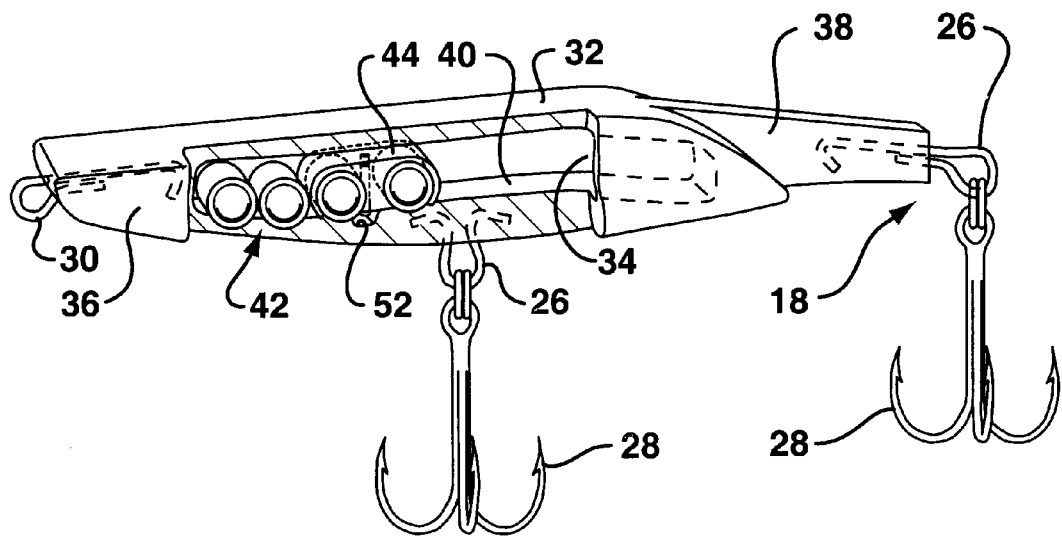
FIG. 2B is a partial cross-sectional view of a component of the embodiment of FIG. 1.

Referring now to FIGS. 2A and 2B, lure body 10 is constructed from hull 12 and a cartridge 32 that is inserted into or contained within hull 12. (Cartridge 32 is shown with phantom lines in FIG. 1). Cartridge 32 defines an interior channel 34 that is oriented longitudinally along the cartridge 32 of lure body 10. In the direction moving from the head section 36 to the tail section 38 of cartridge 32, interior channel 34 includes an incline 40. For the exemplary embodiment of a lure body 10 being described, interior channel 34 is formed as a single chamber within cartridge 32. It should be understood, however, that interior channel 34 could be formed from a variety of configurations—including internals walls or other internal structures.

A plurality of weights 42 are positioned within interior channel 34 and configured for movement along the interior channel 34. As shown in the exemplary embodiment of the figures, the weights 42 are cylindrically shaped and can be made to roll or slide along interior channel 34 between the head section 36 and tail section 38 of cartridge 32 when lure body 10 is in use. Although four weights 42 are depicted in the figures, any number of weights may used. Furthermore, a lure body 10 utilizing only one weight is within the scope of the present invention as set forth in the claims below.

Figure 2C:
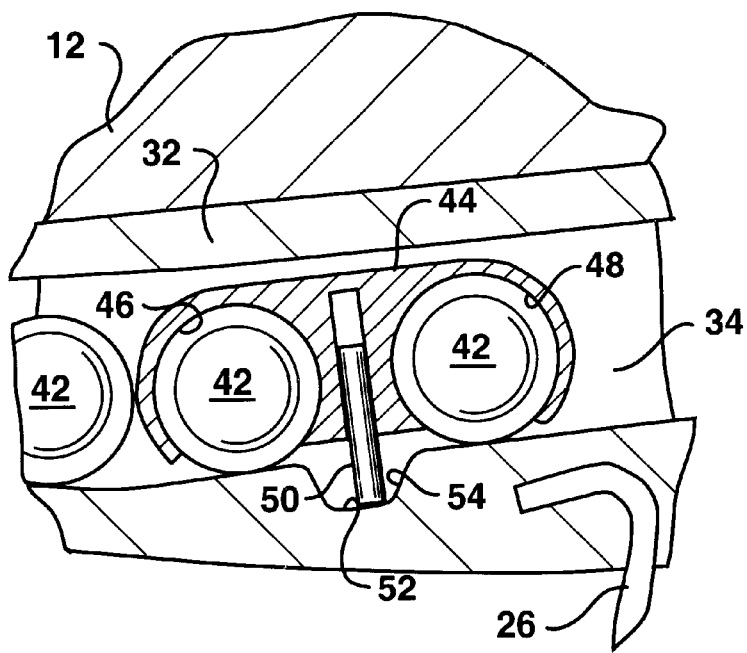
FIG. 2C is a close-up view taken as shown by the circle in FIG. 2A.

As shown in FIG. 2C, in this particular exemplary embodiment of the invention, the lure body 10 includes a rider or lock mechanism 44 that is configured to move along the interior channel 34 in conjunction with the plurality of weights 42. The lock mechanism 44 includes pocket 46 and pocket 48 for the receipt of two of the plurality of weights 42. As the weights 42 move along interior channel 34, mechanism 44 moves with the plurality of weights by "riding" upon the weights in pockets 46 and 48. While the exemplary embodiment shows mechanism 44 configured for moving with two of the weights 42, it should be understood that it is within the spirit and scope of the present invention to configure mechanism 44 to move alone or upon one or any number of weights 42.

Retractable boss 50 is positioned within lock mechanism 44. The boss 50 is capable of moving between two positions during operation of the lure body 10. During casting, the boss 50 is caused to retract within mechanism 44 (as will be more fully discussed). The retraction of boss 50 allows the mechanism 44 to move from the head section 36 towards the tail section 38 of cartridge 32 and thereby allows the plurality of weights 42 to so move along the interior channel 34. During retrieval of the lure body 10 through the water while fishing, boss 50 is caused to extend into a recess 52 along interior channel 34, as depicted in FIG. 2C. In this extended position, boss 50 restrains locking mechanism 44 within the head section 36 of cartridge 32 and thereby also causes the plurality of weights 42 to remain in the head section 36. FIGS. 2A through 2C depict but one exemplary embodiment of a lock mechanism 44 by which the position of the weights 42 can be secured within the lure body 10, and it should be understood that other embodiments are within the spirit and scope of the present invention. By way of example only, lock mechanism 44 includes any structure configured to move or ride with one or more weights and used to secure the position of the weights.

Figure 3A:
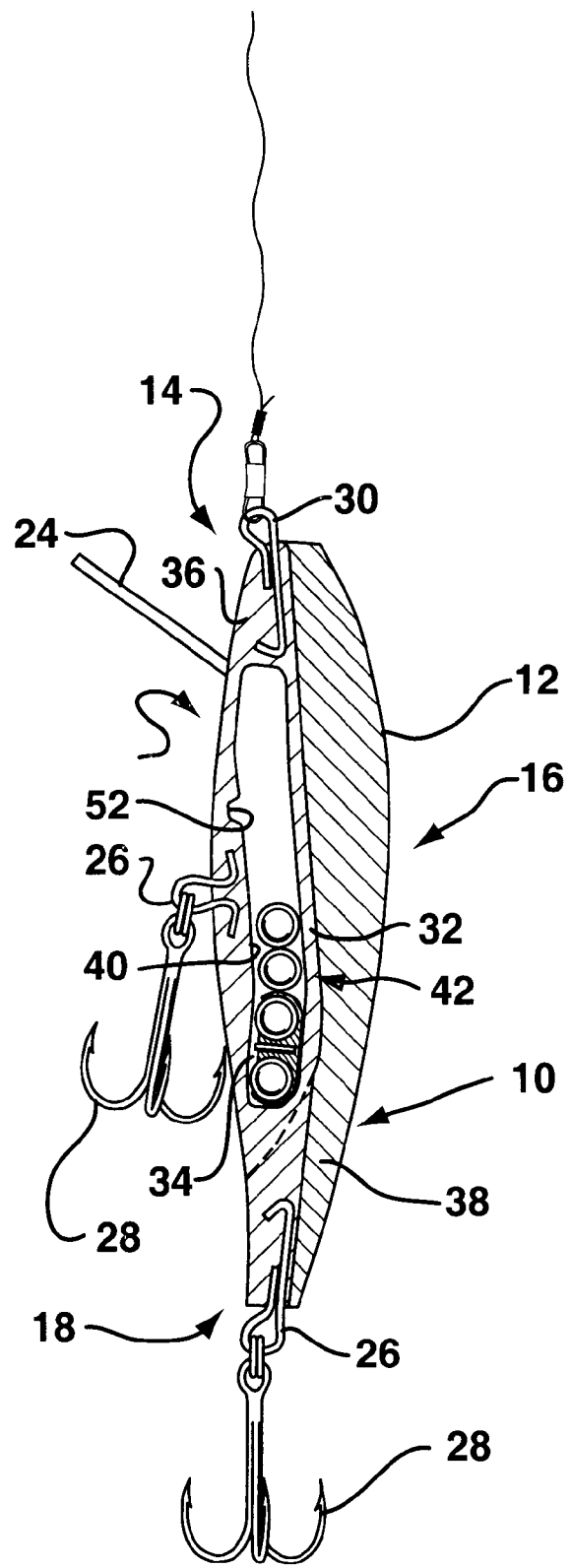
FIGS. 3A–3C are cut-away views of the embodiment of a lure illustrated in FIG. 1 and depicting the operation of this embodiment.

FIGS. 3A though 3C will now be used to more fully describe the operation of this exemplary embodiment of the present invention. Just before casting the lure body 10, an angler will generally position the lure body 10 from the fishing line in a vertical position as shown in FIG. 3A. The force of the plurality of weights 42 is exerted on lock mechanism 44 which in turn causes retractable boss 50 to move along a ramped wall 54 (shown in FIG. 2C) in recess 52. The combined effect of the rearward motion of mechanism 44 and ramped wall 54 causes the boss 50 to be moved into its retracted position within mechanism 44. The plurality of weights 42 is thereby released, moves along interior channel 34, and comes to rest in the tail section 38 of cartridge 32. As a result, the center of gravity of lure body 10 is moved toward tail section 18.

During casting, the plurality of weights 42 generally remain in the tail section 38 of cartridge 32. As the lure body 10 lands and come to rest in the water, the lure body 10 remains in a vertical position (as shown in FIG. 3A) in the water and the plurality of weights 42 therefore also remain in tail section 38. Again, in this position, the center of gravity of lure body 10 remains generally within tail section 18 of lure body 10.

Figures 3B, 3C:
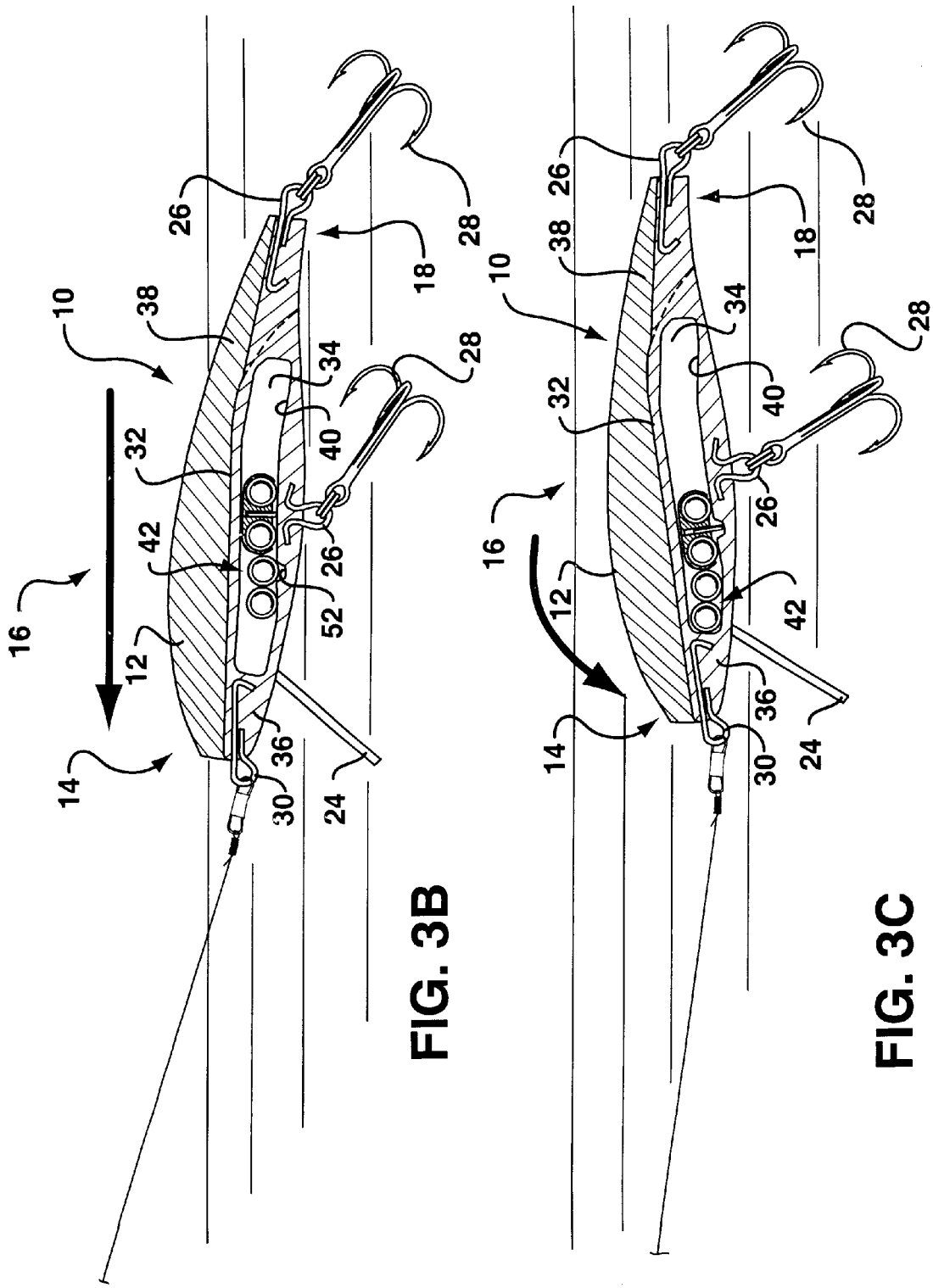

After landing in the water, the angler begins to retrieve the lure body 10 by reeling in fishing line 56. As the lure body 10 is pulled forward at the point of connection (loop 30) with fishing line 56, the diving plane 24 drags against the water and causes the lure body 10 to move from the vertical position of FIG. 3A to the horizontal position shown in FIG. 3C, with FIG. 3B showing an intermediate position between those of FIGS. 3A and 3B. As a result, the plurality of weights 42 are caused to slide or roll along interior channel 34 because of the incline 40.

As the plurality of weights 42 reach the head section 36 of cartridge 32, the boss 50 of lock mechanism 44 falls into recess 52. Boss 50 thereby secures the plurality of weights 42 within the head section 36 of cartridge 32 during the retrieve. As a result, the overall center of gravity of lure body 10 is moved towards the head section 14 of lure body 10 to ensure proper operation and movement of the lure body 10 as it is retrieved through the water by the angler.

The above is a description of an exemplary embodiment of the present invention and other embodiments are within the spirit and scope of the invention as claimed below. By way of example only, the exemplary embodiment discussed above used a cartridge 32 that was placed within a hull 12 to create the overall lure body 10. However, it should be understood that lure body 10 could be constructed as a single piece or unit with also providing the overall shape and outward appearance of lure body 10. Also, using the teachings disclosed herein, one of skill in the art will recognize that various other mechanisms that are within the scope of the following claims can be used to control the position of the weight(s) within the lure body. Therefore, it should be appreciated by those skilled in the art that modifications and variations can be made to the lure as described herein, without departing from the scope and spirit of the claims. It is intended that the invention include such modifications and variations as come within the scope of the appended claims and their equivalents.

What is claimed is:

1. A fishing lure, comprising:
   a lure body having an interior channel oriented longitudinally within said body;
   a plurality of weights configured for movement along said interior channel of said body;
   a lock mechanism configured to move along said interior channel in conjunction with said plurality of weights; and
   a retractable boss positioned within said lock mechanism, said boss having an extended position for securing the position of said lock mechanism at the front of the lure during retrieval of the lure and a retracted position for allowing said lock mechanism to move to the rear of the lure for casting.

2. A fishing lure as in claim 1, wherein each of said plurality of weights is cylindrically shaped.

3. A fishing lure as in claim 1, wherein said lock mechanism has a pocket for the receipt of at least one of said plurality of weights.

4. A fishing lure as in claim 1, wherein said lure body has a head section and a tail section, and wherein said interior channel includes an incline moving in the longitudinal direction moving from said head section to said tail section.

5. A fishing lure as in claim 4, wherein said interior channel includes a recess for the receipt of said retractable boss.

6. A fishing lure as in claim 5, wherein said recess has at least one inclined wall located at a distinct longitudinal position along said interior channel.

7. A fishing lure as in claim 1, wherein said lure body is comprised of a hull into which a cartridge is inserted to form the overall shape of the lure.

8. A fishing lure as in claim 1, wherein said lure body forms the overall shape of the lure.

9. A fishing lure, comprising:
   a body having a pathway along the longitudinal axis of said body, wherein the pathway includes a recess at a longitudinal position thereof;
   a weight located within the interior of said body and configured for movement along the pathway;
   a rider having at least one hub for the receipt of said weight and configured for moving with said weight along the pathway; and
   a retractable pin carried by said rider, said pin securing the position of said rider at the front of the lure during retrieval by resting within the recess, and said pin allowing the rider to move to the back of the lure for casting by retracting into said rider.

10. A fishing lure as in claim 9, wherein said weight is cylindrically shaped.

11. A fishing lure as in claim 9, wherein said body has a head section and a tail section, and wherein the pathway of said body includes an incline along the longitudinal direction moving from the head section to the tail section.

12. A fishing lure as in claim 9 wherein said recess has at least one inclined wall located at a distinct longitudinal position along the body.

13. A fishing lure as in claim 9, further comprising a hook loop attached to said body for connecting a hook to the lure.

14. A lure having a movable weight system, comprising:
   a lure body having exterior walls and interior walls, a front portion and a rear portion, a top portion and a bottom portion, wherein the interior wall along the bottom portion forms a longitudinally oriented channel;
   at least two weights configured for rolling or sliding along the channel; and
   means for retaining said weights near the front portion of said lure as the lure is being retrieved and for allowing said weights to be released from the front portion to move toward the rear portion for casting.

15. A lure having a movable weight system as in claim 14, wherein said weights are cylindrically shaped.

16. A lure having a movable weight system as in claim 14, wherein the longitudinally oriented channel is inclined upwardly from the front portion to the rear portion of said lure body.

17. A lure having a movable weight system, comprising:
   a cartridge having exterior walls and interior walls, a front portion and a rear portion, a top portion and a bottom portion, wherein the interior wall along the bottom portion forms a longitudinally oriented channel;
   at least one weight configured for rolling or sliding along the channel; and
   means for retaining said weight near the front portion of said lure as the lure is being retrieved and for allowing said weight to be released from the front portion to move toward the rear portion for casting.

18. A lure having a movable weight system as in claim 17, further comprising a hull into which the cartridge is at least partially inserted to form the overall shape of the lure.

19. A lure having a movable weight system as in claim 18, wherein said hull is constructed at least partially from a wood based material.

20. A lure having a movable weight system as in claim 18, wherein said hull includes various ornamental features providing the lure with a fish-like appearance.

* * * * *